HIDEYUKI KIKUCHI
INVENTOR

Patented Oct. 24, 1939

2,177,070

UNITED STATES PATENT OFFICE 2,177,070

METHOD FOR METALLURGICAL TREATMENT OF ORES BY HIGH FREQUENCY ELECTRIC CURRENTS

Hideyuki Kikuchi, Nihonbashi-ku, Tokyo, Japan, assignor to Nihon Koshuha Jukogyo Kabushiki Kaisha, Keijo, Korea, a corporation of Japan Application February 9, 1938, Serial No. 189,510
In Japan January 12, 1935

4 Claims. (Cl. 75—10)

This application is a continuation in part of my U. S. patent application Serial No. 55,983, filed December 24, 1935.

This invention relates to a method for metallurgical treatment of ores by high frequency electric currents.

The method according to this invention differs fundamentally from the well-known method in which induction heat is used, and the essence of this invention resides in that the ores in the form of small granules are subjected in an electrode furnace to the action of high frequency currents having a voltage of above 1000 v. and a frequency above 100,000 C/S. applied to the electrodes, the ores being mixed with small quantities of granulated reducing agents with or without addition of fluxes. The powderous mixture of electrically non-conductive ore granules with granules of electrically conductive reducing agents and fluxes has electrically discontinuous conductive properties, that means if high frequency electric current of at least 100,000 C/S. and more than 1000 v. is applied to said mixture through spaced electrodes, the current flows from one electrode to the other in the form of minute discharge sparks produced between the granules in the mixture.

The main object of this invention is to provide a method, by which high grade metals or alloys, including no appreciable amounts of injurious solid and gaseous elements, are directly, easily and economically produced from the ores, especially from poor ores.

In this invention, for reducing agents use is made of graphite, coke and charcoal for iron ores; of iron for galena and diaspore; of graphite and hydrogen gas for molybdenum oxide. Although in the method according to this invention, since high frequency electric currents are used, the amount of reducing agents needed is considerably smaller than that required in the usual method, the results of the treatment are more affected by the physical nature of the ores than by their chemical nature: for instance, crystalline materials give better results than non-crystalline materials, and if these ores are not of a crystalline nature, it is preferable to add some suitable crystalline substances before treatment.

In the method according to the invention the physical nature of the fluxes should also be suitably selected, for instance, as for a flux for silica, which is contained in titanium iron sand ores, clay is better than lime.

For producing alloys directly from several kinds of ores or metallic elements, several kinds of reducing agents and fluxes may be required.

In this invention for making good non-continuous conductors, electrically conductive material such as coke, graphite, charcoal, soot, metal and the like and non-conductive material such as coal, lignite, anthracite, oil shale, wood chips and the like are used. The size of their granules must be suitably selected, to give the desired non-continuous conductivity, i. e. electric impedance to the mixture to be treated.

The relation between the grain size of the mixture to be treated and the frequency of the electric currents to be applied to said mixture is substantially linear. For grain sizes between 5 mesh and 200 mesh, the corresponding frequencies are 100,000 to 5,000,000 cycles per sec. In order to obtain the most economical results, the grain size of the material should be between 5 and 100 mesh and the frequency of the current between 100,000 and 1,000,000 cycles per sec. In the method according to the invention, ores containing the metals of the 8th group (iron and the like) can be reduced without difficulty while air is present in the surrounding gas, but reducing gases are preferable for elements belonging to the first group and neutral gases are preferable for ores of metals belonging to the 4th group e. g. tin and the like. An open furnace, a semiclosed furnace or a closed furnace must be chosen according to the kind of ores to be treated, and the nature of the current used.

Sulphide ores such as $MoS_2$ and the like and carbonate ores such as $MnCO_3$ and the like may be reduced by the method according to the invention after they have been converted into oxides by roasting.

In the method according to this invention, not only suitable compositions of ores, reducing agents and fluxes but also the size of granules thereof, voltage of high frequency electric current to be used, the time rate of electric current change and the rate of quenching of current must be properly chosen because the degree of purity of the reduced metals depends upon the above said conditions. In order to obtain a good reducing action, a current having a high modulation and a sharp wave form should be used. High frequency currents, transient currents and impulsive currents are suitable for this purpose.

According to the kinds of oscillators used, D. C. or A. C. or medium frequency current may be used as the current source and high frequency electric currents, which are generated from D. C., A. C. or medium frequency current may be used according to the kinds of ores to be treated.

Further, according to the invention, in addition to the high frequency electric current, an electric current having a high rate of current change can be employed. It has been found that, when such a current is applied after the high frequency current has been used, better results are obtained in the agglomeration of the reduced metallic particles.

The method according to the invention can be effectively used for the reducing of the ores in an early stage of their treatment. The subsequent treatment such as the remelting of the reduced spongy materials produced by the method of this invention may be carried out by ordinary furnaces or electric furnaces.

When the portion of the mixture disposed between the electrodes has been melted by the effect of the high frequency electric current as above-described, and the impedance of the mixture to be treated is decreased in accordance with the progress of its reduction, the voltage and frequency of the current applied are gradually decreased and the amperage of said current is gradually increased, in order to accomplish the further reduction with the greatest possible power efficiency.

Several embodiments of the apparatus, which may be used for carrying out the method according to this invention, are illustrated in the accompanying drawing, in which.

*Examples*

Direct reduction of metals from poorly crystalline hematite ($Fe_2O_3$) containing a large amount of $SiO_2$.

Figure 1:
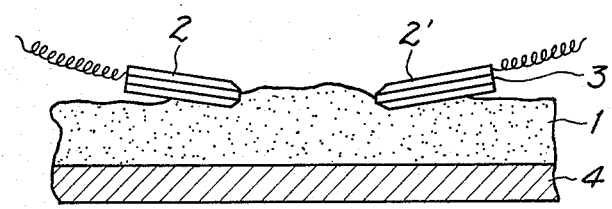
Figures 1 and 2 show a sectional elevation of an open furnace used for reducing hematite ($Fe_2O_3$) ore by the method according to this invention.
Figure 2:
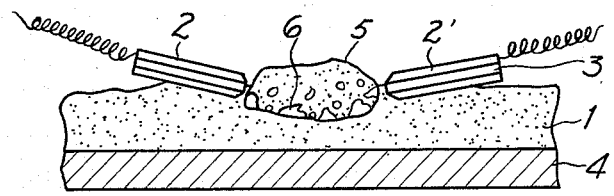

In Figs. 1 and 2, 1 designates the electrically discontinuous conductive mixture composed of 100 parts of poorly crystalline (hexagonal system) hematite powder containing Fe and $SiO_2$ 37.0% and 42.0% respectively, 5–10 parts of coke or graphite powder and 10–5 parts of low-grade coal powder containing S and ash 3.3% and 14% respectively, the size of grain of each powder being under 15 meshes per inch: 4 is the insulated base of the open furnace and 2 and 2' are carbon electrodes having an axial bore 3. When a high voltage high frequency current (50,000 volts 150,000 cycles per sec.) is applied to the hollowed carbon poles 2 and 2', which are placed at a distance of 250 cm., numerous minute local discharges are brought about between the particles in the mixture. These local discharges heat the mixture and cause a rapid combustion of the reducing agents and a corresponding reduction of the ore particles. When the high voltage high frequency current is first applied to the electrodes, the reaction is started at a temperature below 1280° C. along the axial line connecting the two electrodes 2 and 2'. As the treatment continues, the reaction proceeds outwardly owing to the skin effect of the high frequency electric current. Thus, the "reaction surface", i. e., the bounding surface between the molten mass and the mixture not yet molten grows out in irregular spindle shape as indicated by the reference 5 in Fig. 2. As the reducing efficiency rises and the quantity of electric power per unit of reduced metal falls only for about the first 4 to 5 minutes of each reaction, it is preferable to interrupt the input of power after that time, whereupon the growth of the reaction surface ceases. During the period when the high frequency current acts on the mixture the impurities such as sulphur and phosphorus, which are contained in the molten material 5, are violently evaporated and separated from the reduced metal particles, indicated by 6 in Fig. 2. Thus, the reduced metal particles 6 are completely separated from the slags and distributed in the axial line of force.

Each individual reducing operation converts the part of the ore mixture present between and adjacent the electrodes into metal sponge material. In practice, the furnace is charged, for example, with 100 times the quantity which is treated in a single operation. After each reducing operation, the produced sponge is removed and the remaining material is redistributed to fill the space between and around the electrodes, whereupon the operation is repeated. When half of the original charge has been treated, a fresh quantity of powder mixture corresponding to half the original charge is supplied and mixed with the remainder of the original charge and so on. It is advisable to employ two or more furnaces and to use them alternately.

The time required for one complete operation as above-described is only about six minutes and from 100 parts of hematite ore, present between and adjacent the electrodes, 90 parts of sponge material 5, which weighs 12 kg. can be obtained. Thus, the amount of reduced sponge material 5 produced per hour is 120 kg. After crushing said sponge material 5, by applying magnetic separation 40 parts (53 kg.) of iron including 20 parts (26.5 kg.) of iron of grain size larger than 10 meshes per inch are obtained. After removing the slag from the surface of said iron granules it is found that the iron has such good quality that it contains Fe 99.5%, Si 0.1%, C 0.05%, P 0.01%, S 0.03%. By remelting the remaining powdered iron of size under 10 meshes per inch 10 parts (13.5 kg.) iron containing Fe 99.5% is obtained.

From the above description it will be understood that from 100 parts of hematite ore containing 37 parts of iron, 30 parts (40 kg.) of metallic iron can be obtained. In this way for obtaining 40 kg. of reduced metallic iron 65 kw. h. input power is required. From the above it will be understood that for obtaining one ton of reduced iron from the hematite ore above-described the electric power of 1625 kw. h. is required. The efficiency of the transformation of ordinary electric current to high frequency electric power is calculated to be under 20% and therefore the net amount of high frequency electric current, which is required for reducing one ton iron by the method according to this invention, amounts to less than 325 kw. h. The consumption of carbon electrodes is also very small, for example 0.1 kg. carbon electrode was consumed in producing one ton of iron.

The iron produced by the method according to this invention differs in nature from that of iron produced by the ordinary method as the course of the reduction differs from that of the ordinary process for producing iron. That is to say, the iron produced by the method according to this invention has a very fine net-like structure, which can be observed through a microscope giving an enlargement of 2500 diameters and it has clear and sharp and fine X-ray analysis line structure diffracted by the space lattice plane containing a relatively low density of atom distribution, which shows that the space lattice is regularly arranged in a plane and normalized. Thus its mechanical strength and elasticity are considerably increased compared with that of ordinary iron and also, since it has a very high grade chemical composition, its chemical strength, i. e. its anticorrosive properties are considerably greater than those of ordinary iron.

In the example above-described, if some of the conditions, i. e. the method of generating the high frequency electric current, the form of the waves and the duration of the reaction are not altered, but other conditions, such as the size of the particles of the materials to be treated and the frequency number of the current used and the composition of the materials to be treated are changed respectively to the size of 5 meshes per inch and to a frequency of 50,000 cycles per sec. and to a mixture composed of 100 parts of hematite above-described and 35 parts of coke or to a mixture composed of 100 parts of hematite, 35 parts of coke with 15 parts of coal, 20 parts of limestone and 15 parts of oil shale, ferro-silicon containing Fe 77%, Si 22%, C 0.1% will be produced. In this case for obtaining one ton of ferrosilicon electric power amounting to 3250 kw. h. will be required.

The ferrosilicon produced by the method above-described has the property of large permeability and small high frequency hysteresis loss, and therefore said ferrosilicon can advantageously be used for electric devices. In this example if one of the conditions, for instance, the method for transforming the frequency or high frequency generator, wave forms and reaction time, is altered, all the reactions are altered and a different result will ensue. For example, if as the electric power source an electric current having a frequency of 500,000 cycles is used instead of the electric current having a frequency of 50,000 cycles, as used in the example above-described, the results obtained are almost chemically equivalent to those in the above-described example, but the size of the particles of reduced metal is much smaller than that of the particles of metal which are produced in the above-described example. If to a mixture, composed of 100 parts of hematite above-described, 35 parts of coke, 15 parts of coal, 35 parts of lime, 15 parts of oil shale and crushed to a size under 100 meshes per inch, the continuous wave high frequency electric current, produced by a valve oscillator and having 5,000,000 cycles per sec. and voltage of 1000 is applied repeatedly for periods of nine seconds each, reduced metal particles containing Fe 95.5% and Si 4.0% will be obtained.

A method for treating poor minerals, especially for poor tin stone containing impurities such as W, Mn, Fe, Si.

Figure 3:
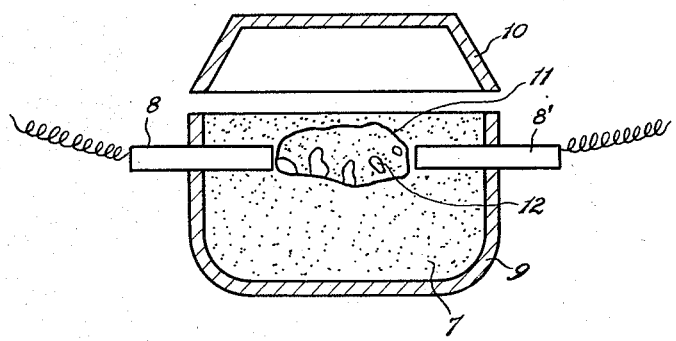
Figure 3 shows in vertical section a semiclosed furnace used for reducing tin stone.

Tin stone ores containing impurities such as W, Mn, Fe, Si are difficult to reduce to the metal in refractory furnaces of the type ordinarily used for metallurgical purposes, even if said ore contains a comparatively large percentage of Sn. If said ore is strongly heated in the ordinary furnace, then the larger part of the useful tin is vaporized and escapes and some metallic compounds which are difficult to remelt are left. Poor tin stone however containing 10% of Sn and impurities such as W, Mn, Fe, Si can easily and effectively be reduced by the method according to this invention by using such apparatus as shown in Fig. 3. In the said figure 7 designates the mixture of materials to be treated. 8 and 8' are solid carbon electrodes. The reference characters 9 and 10 denote the parts of the semi-closed insulated furnace. 11 is the sponge material produced from the mixture 7 between the electrodes by the effect of the high frequency electric current applied and 12 is the reduced granular metallic tin dispersed in the sponge material 11.

The mixture 7 is composed of 100 parts of tin stone powder containing 19% of Sn (this tin stone powder is obtained by means of air separation from tin stone containing 10% of Sn) and 50 parts of charcoal and is crushed below the size of 30 meshes per inch. By applying to said mixture high frequency electric current (500,000 cycles per sec.), in six successive operations of ten minutes duration each, 15 parts (20 kg.) metallic tin granules can be obtained. The first application of the high frequency current reduces about one sixth of the mixture. After removing the reduced material and supplying a fresh quantity of about one sixth of the original charge, the second application of the high frequency current is effected, and so on, until after six applications of the high frequency to the mixture, that is to say, after a total treatment of one hour duration, 20 kg. of metallic tin granules have been obtained. For obtaining one ton of metallic tin from said tin stone by the method above-described 3500 kw. h. electric current is required. By remelting said metallic tin granules high grade tin ingot containing 99.9% of Sn and traces of W, Mn, Fe can be obtained.

It can be asserted that by applying the method according to this invention almost all poor minerals can economically be treated, as for example, iron ores containing as little as 2% Fe; Ni and Co ores with 0.2% of Ni and Co contents. As a practical example, when garnierite containing 0.3% Ni and 6% Fe is treated by the method according to this invention, a ferro-nickel alloy, containing 13% of Ni and 85% of Fe is obtained, in which alloy each metallic element is disposed separately in the microscopic structure.

As a third example, by treating rhodochrosite containing 25.1% Mn and 5.6% Fe by the method according to this invention ferro-manganese granules containing 80% Mn, 19% Fe, 0.5% C can be produced.

Besides the above mentioned examples, poor minerals containing valuable metals such as Pb, Ta, Nb, W, Mo, Cr, Al can economically be treated in analogous ways by the method according to this invention.

The treatment of molybdenum oxide.

Molybdenum oxide must be treated under non-oxidizing atmospheric conditions, and therefore in this case the mixture, which is composed of 100 parts of $MoO_2$ and 40 parts of pure graphite and crushed below 10 meshes per inch, is placed in an insulated tube with the introduction of $H_2$. By applying a high voltage (above 2000 v.) high frequency (500,000 cycles per sec.) electric current through electrodes inserted into the tube, quenched high frequency discharges are produced between the graphite particles by the effect of quenching action of the $H_2$. By this method the reduction of $MoO_2$ powder is brought about quickly and effectively and then the reduced Mo metal coalesces into granules of which the Mo content is 98%.

In some cases, it is not absolutely necessary to use $H_2$ gas but it is absolutely necessary to avoid the presence of an oxidizing atmosphere in treatment of molybdenum oxides as above-described.

Having now particularly described and ascertained the nature of my said invention and in what manner the same is to be performed, I declare that what I claim is:

1. The herein described method of reducing ores, which method consists in mixing the granulated electrically non-conductive ores with an amount of granulated at least partly electro-conductive reducing agents at least equal to that theoretically necessary to reduce the charge and in a proportion to the latter to produce a powderous mixture having discontinuous electro-conductive properties, and subjecting said mixture in an electrode furnace to the action of a high frequency current having a voltage above 1,000 v. and a frequency of at least 100,000 C/S., whereby numerous minute local discharge sparks are generated in said mixture.

2. A method, as claimed in claim 1, in which the current is applied intermittently.

3. Method, as claimed in claim 1, in which ores having the form of amorphous powders are mixed with other crystalline substances before application of the high frequency currents.

4. A method, as claimed in claim 1 in which a granulated fluxing agent is added to the charge before application of the current.

HIDEYUKI KIKUCHI.